United States Patent [19]

Shawke

[11] 4,186,491
[45] Feb. 5, 1980

[54] GAUGE ASSEMBLY

[75] Inventor: Jerome R. Shawke, Hudson, Ohio

[73] Assignee: The Warner & Swasey Company, Cleveland, Ohio

[21] Appl. No.: 887,207

[22] Filed: Mar. 16, 1978

[51] Int. Cl.² ........................... G01B 7/02; G01B 7/12
[52] U.S. Cl. .............................. 33/143 L; 33/178 E; 33/DIG. 2
[58] Field of Search ............ 33/143 L, 147 E, 147 L, 33/147 N, 178 E, DIG. 2; 51/165 R, 165.74

[56] References Cited

U.S. PATENT DOCUMENTS

| 3,103,072 | 9/1963  | Golley et al. ....... | 33/143 L  |
| 3,109,265 | 11/1963 | Wiatt et al. ........ | 51/165 R  |
| 3,354,553 | 11/1967 | Heldmaier .......... | 33/DIG. 2 |
| 3,755,909 | 9/1973  | Asano et al. ........ | 33/143 L  |
| 3,781,997 | 1/1974  | Pagella et al. ...... | 33/143 L  |
| 3,802,086 | 4/1974  | Walker .............. | 33/DIG. 2 |
| 3,851,396 | 12/1974 | Klabunde ............ | 33/143 L  |

Primary Examiner—Richard R. Stearns

[57] ABSTRACT

An improved gauge assembly is utilized to measure the size of a workpiece during a grinding operation. The gauge assembly includes upper and lower gauge members which are movable under the influence of a pair of fluid motors. When the gauge assembly is in an open condition, the upper gauge member is held in a raised position by a relatively high fluid pressure supplied to the motor associated with the upper gauge member. At the same time a relatively low fluid pressure is supplied to the fluid motor associated with the lower gauge member so that it remains in a lowered position. When the gauge assembly is to be utilized to measure a workpiece, the fluid pressure in the motor for the upper gauge member is decreased to enable the upper gauge member to move downwardly into engagement with the workpiece. At the same time, the fluid pressure in the motor for the lower gauge member is increased to raise the lower gauge member upwardly into engagement with the workpiece. After the two gauge members have closed on the workpiece, the fluid pressure in the motor associated with the lower gauge member is further decreased to a relatively low gauging pressure while the fluid pressure in the upper motor is increased to a relatively high gauging pressure. In order to minimize friction, each of the gauge members is supported for movement by a pair of air bearings.

10 Claims, 8 Drawing Figures

GAUGE ASSEMBLY

BACKGROUND OF THE INVENTION

During grinding and other machining opertions gauges are commonly utilized to measure the size of a workpiece. One of these known gauges is disclosed in U.S. Pat. No. 3,681,582 and includes a pair of gauging members or calipers which are moved relative to each other by screw and nut drive arrangements. A magnetic scale and reading head are utilized to measure the position of the gauge members relative to each other. Other known gauging devices are disclosed in U.S. Pat. Nos. 2,826,818; 3,109,265; 3,568,372; 3,688,411; 3,745,660; 3,755,909; 3,781,977; and 3,851,396.

Although these known gauge assemblies are more or less satisfactory in their construction and mode of operation, it is believed that they do not provide optimum gauging characteristics. Accordingly, there is a need for an accurate automatically adjustable gauge assembly that can measure a range of workpiece diameters, such as on multiple diameter shafts. This in-process adjustable gauge should have an accurate reader to provide the necessary feedback in order to allow a numerically controlled machine to achieve the desired grinding tolerances. In addition, the gauge should have a repeatable and accurately determined gauging pressure in order to provide repeatable accuracy in the measuring of parts having a tolerance range of 0.0001 inches on the diameter. In order to provide for accurate measurement of parts with these tolerances, a consistent gauging force must be applied to the part by the gauge members or calipers.

SUMMARY OF THE PRESENT INVENTION

The present invention provides a new and improved gauge assembly having upper and lower gauge members or calipers which are movable relative to each other. A pressure responsive fluid motor is provided to move the upper gauge member between a raised position in which it is spaced apart from the workpiece and a lowered position in which the upper gauge member engages the workpiece. The lower gauge member is movable by a second pressure responsive fluid motor between a lowered position in which it is spaced apart from the workpiece and a raised position in which it engages the workpiece.

During a gauging operation, a relatively low fluid pressure is directed to the pressure responsive motor connected with the upper gauge member or caliper. This enables the upper gauge member to press downwardly, under the influence of gravity, against the workpiece with a predetermined gauging force. At the same time, a predetermined fluid pressure is ported to the motor associated with the lower gauge member or caliper to hold it upwardly against the workpiece with a predetermined gauging force. Since the fluid pressures ported to the motors are accurately repeatable, the gauging force applied against the workpiece by the gauging members during successive gauging operations remains constant. To facilitate movement of the gauge members, they are supported by fluid bearings.

Accordingly, it is an object of this invention to provide a new and improved gauge assembly which is capable of accurately gauging a workpiece with a pair of gauge members which apply a predetermined and repeatable gauging force to the workpiece.

Another object of this invention is to provide a new and improved gauge assembly as set forth in the next proceeding object and wherein the gauging force is determined by fluid pressures directed to pressure responsive motors connected with the gauge members.

Another object of this invention is to provide a new and improved gauge assembly having gauge members which are supported by fluid bearings to facilitate movement of the gauge members.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Figure 1:
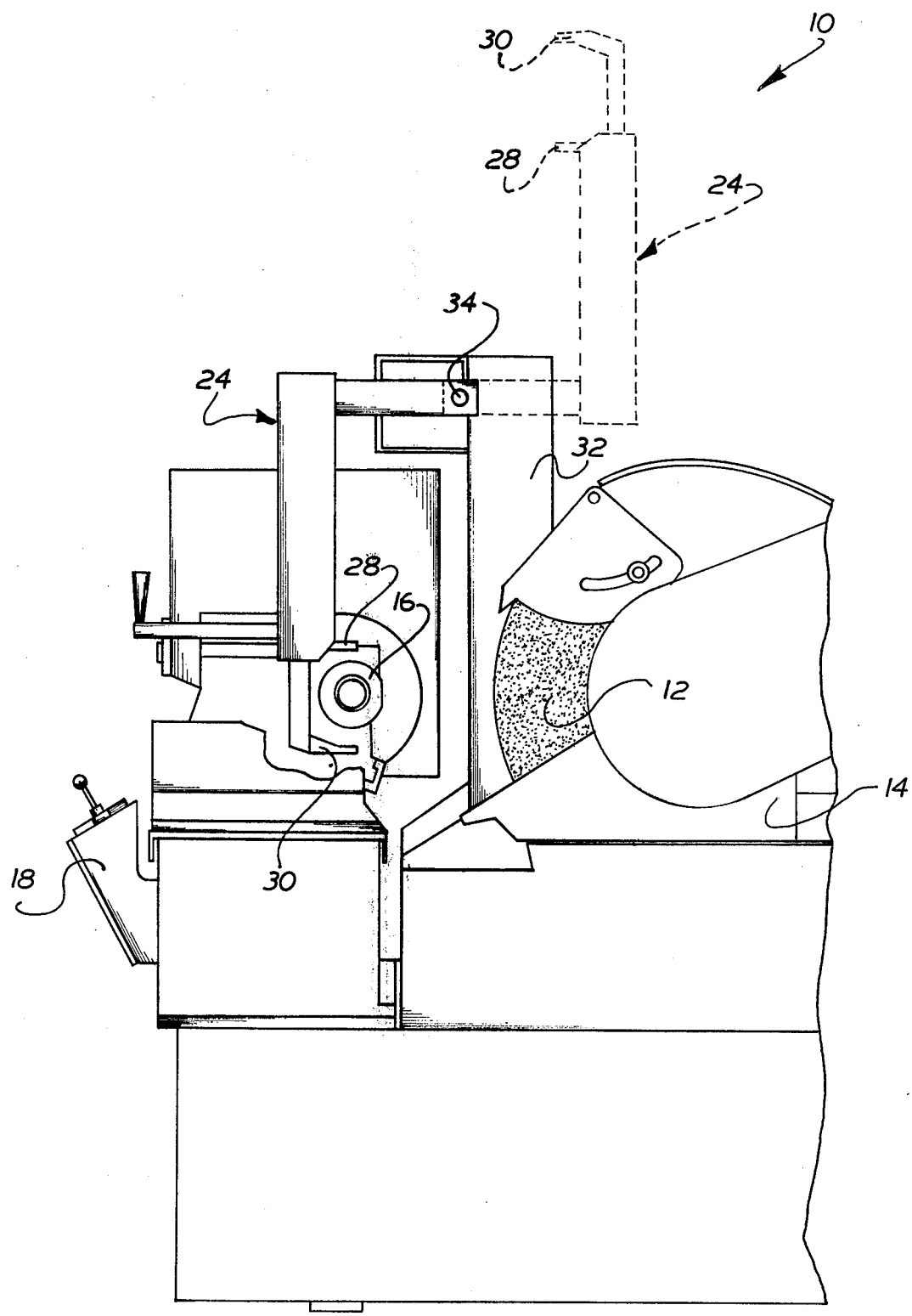
FIG. 1 is an illustration of a grinding machine having a gauge assembly constructed in accordance with the present invention.

A known grinding machine 10 (FIG. 1) has a rotatable grinding wheel 12. The grinding wheel 12 is mounted on a wheel slide 14 which is movable toward and away from the axis of rotation of a chuck 16. The chuck 16 is utilized to rotate a workpiece (not shown) in a well known manner during a grinding operation. Although the grinding machine 10 could be operated manually if desired, it is provided with suitable automatic controls 18 to control the grinding operation.

During the grinding operation, a gauge assembly 24 constructed in accordance with the present invention is utilized to measure the diametral size of the workpiece. During an initial portion of the grinding operation when the workpiece is being loaded into the grinding machine 10, the gauge assembly 24 is not utilized. At this time the gauge assembly remains in a retracted or inactive position illustrated in dashed lines in FIG. 1. Part way through the grinding operation, the gauge assembly 24 is pivoted from the retracted position shown in dashed lines in FIG. 1 to the gauging or measuring position shown in solid lines in FIG. 1.

When the gauge assembly 24 has been moved to the gauging position shown in solid lines in FIG. 1, upper and lower measuring or gauge members 28 and 30 are disposed on opposite sides of the axis about which the chuck 16 rotates the workpiece. The gauge assembly 24 can then be activated to measure the workpiece. Although the gauge assembly 24 has been shown as being connected with a base member 32 at a pivot connection 34 in FIG. 1, it is contemplated that the gauge assembly 24 could be mounted on the grinding machine in many different ways which are well known to those skilled in the art.

Figure 7:
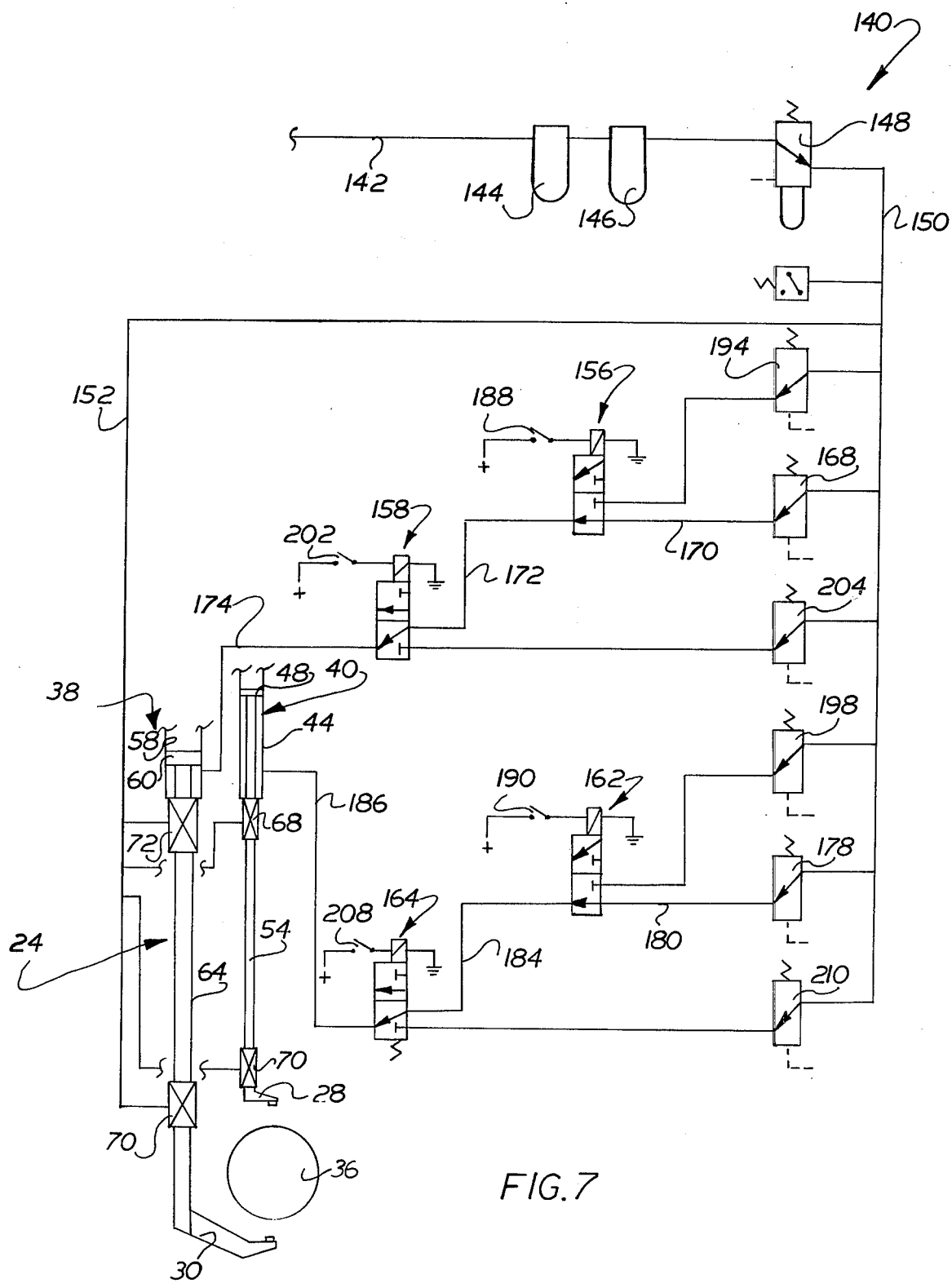
FIG. 7 is a schematic illustration of control circuitry associated with the gauge assembly, the gauge assembly being shown in an open condition.
Figure 8:
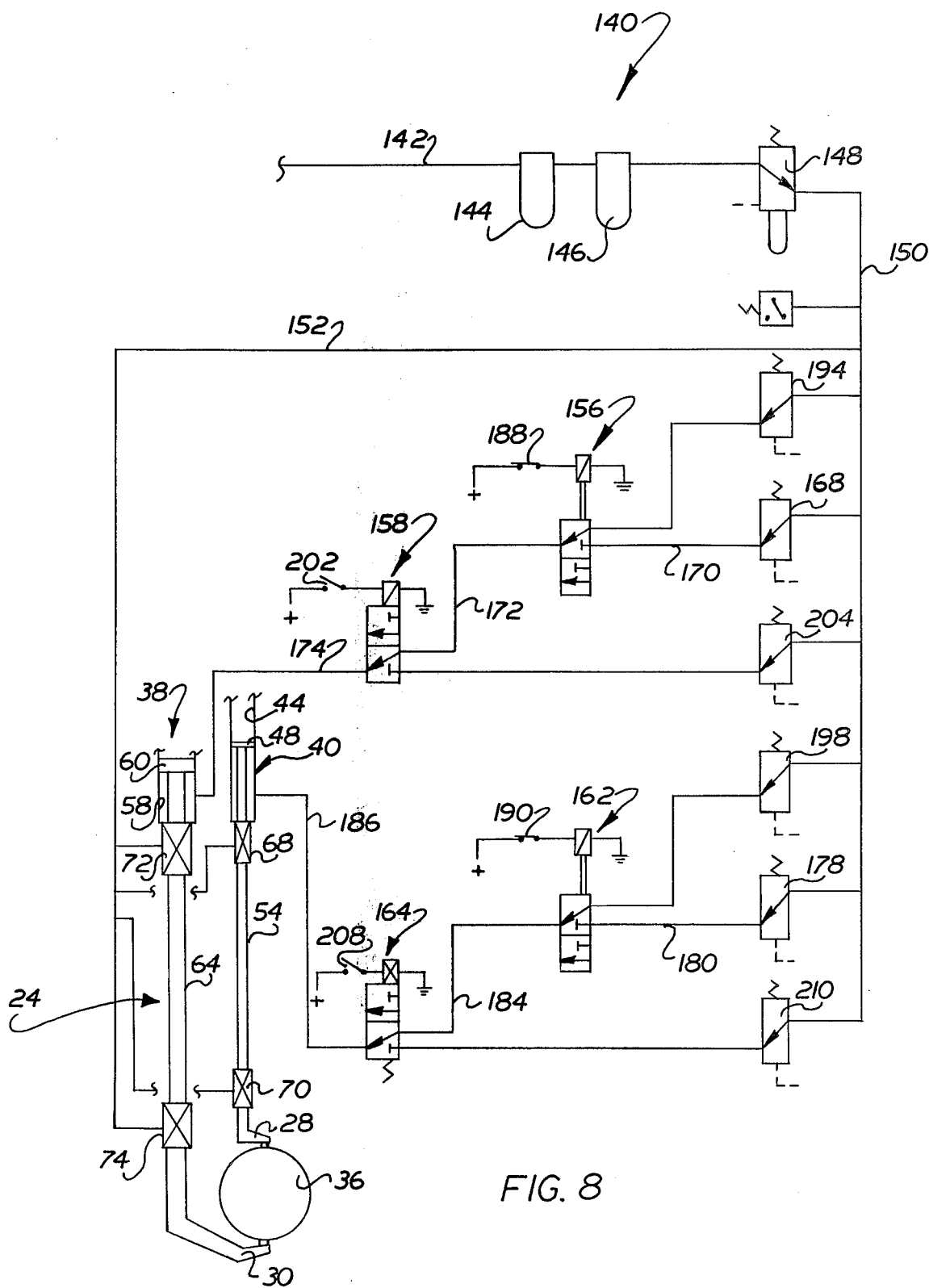
FIG. 8 is a schematic illustration illustrating the control circuitry of FIG. 7 with the gauge assembly in a closed condition prior to the application of a gauging or measuring force to the workpiece by the gauge members.

The upper and lower gauge members 28 and 30 are movable between an open condition shown in FIG. 7 and a closed or gauging position shown in FIG. 8. When the gauge assembly 24 is in the open condition (FIG. 7), the gauge members 28 and 30 are spaced apart from a workpiece 36. When the gauge assembly 24 is in the closed condition (FIG. 8), the gauge members 28 and 30 engage the workpiece 36 under the influence of a pair of pressure responsive fluid motors 38 and 40.

The motor 40 includes a cylinder 44 (see FIG. 2) which is integrally formed with a metal housing 46 for the gauge assembly 24. A cylindrical piston 48 is disposed in the cylinder 44 and has annular sealing grooves 50 which engage the sides of the cylinder. The piston 48 is connected with the upper gauge member 28 by a cylindrical piston rod 54. Therefore, downward movement of the piston 48 in the cylinder 44 is effective to move the upper gauge member 28 from the open position of FIG. 7 to the closed position of FIG. 8.

The pressure responsive motor 38 for moving the lower gauge member 30 is constructed in much the same manner as the pressure responsive motor 40 for moving the upper gauge member 28. The motor 38 for the lower gauge member 30 includes a cylinder 58 (FIG. 2) which is integrally formed with the housing 46 and a cylindrical piston 60 having annular sealing grooves 62. The piston 60 is connected with the lower gauge member 30 by a cylindrical piston rod 64. The piston 60 is moved upwardly in the cylinder 58 to effect movement of the gauge member 30 from the open position shown in FIG. 7 to the closed position shown in FIG. 8.

In order to minimize frictional resistance to movement of the gauge members 28 and 30 and to promote the application of uniform gauging forces to the workpiece 36 when the gauge members are in the closed or measuring position of FIG. 8, the piston rods 54 and 64 (see FIG. 2) are supported by air bearings 68, 70, 72, and 74. The air bearing 74 (FIG. 2) has a porous sintered metal sleeve 76. A cylindrical inner surface of the sleeve 76 is disposed in engagement with the cylindrical outer surface of the piston rod 64.

During operation of the gauge assembly 24, air under pressure is continuously conducted to an opening 78 in a housing for the air bearing 74. The air flows through the opening 78 to a longitudinally extending chamber 80 which is disposed between the porous sintered metal sleeve 76 and a cylindrical nonporous outer sleeve 82. Since the cylindrical sintered metal sleeve 76 is porous, the air flows from the chamber 80 through the sleeve 76 and impinges against the cylindrical outer surface of the piston rod 64. This flow of air provides a fluid cushion which facilitates axial movement of the piston rod relative to tthe bearing sleeve 76. Although there is some leakage of the air along the surface of the piston rod 64, a majority of the air flow through the bearing sleeve 76 results from a flow of air out of the axially exposed end portions of the bearing sleeve 76.

The air bearings 68, 70 and 72 are constructed in the same manner as the air bearing 74. All of the air bearings are continuously supplied with air under pressure during operation of the gauge assembly 24 to provide substantially frictionless movement of the piston rods 54 and 64 relative to the housing 46. It should be understood that although only the air inlet passage 78 for the air bearing 74 has been shown in FIG. 2, similar inlet passages are provided in association with the other air bearings 68, 70, and 72.

Figures 2, 3:
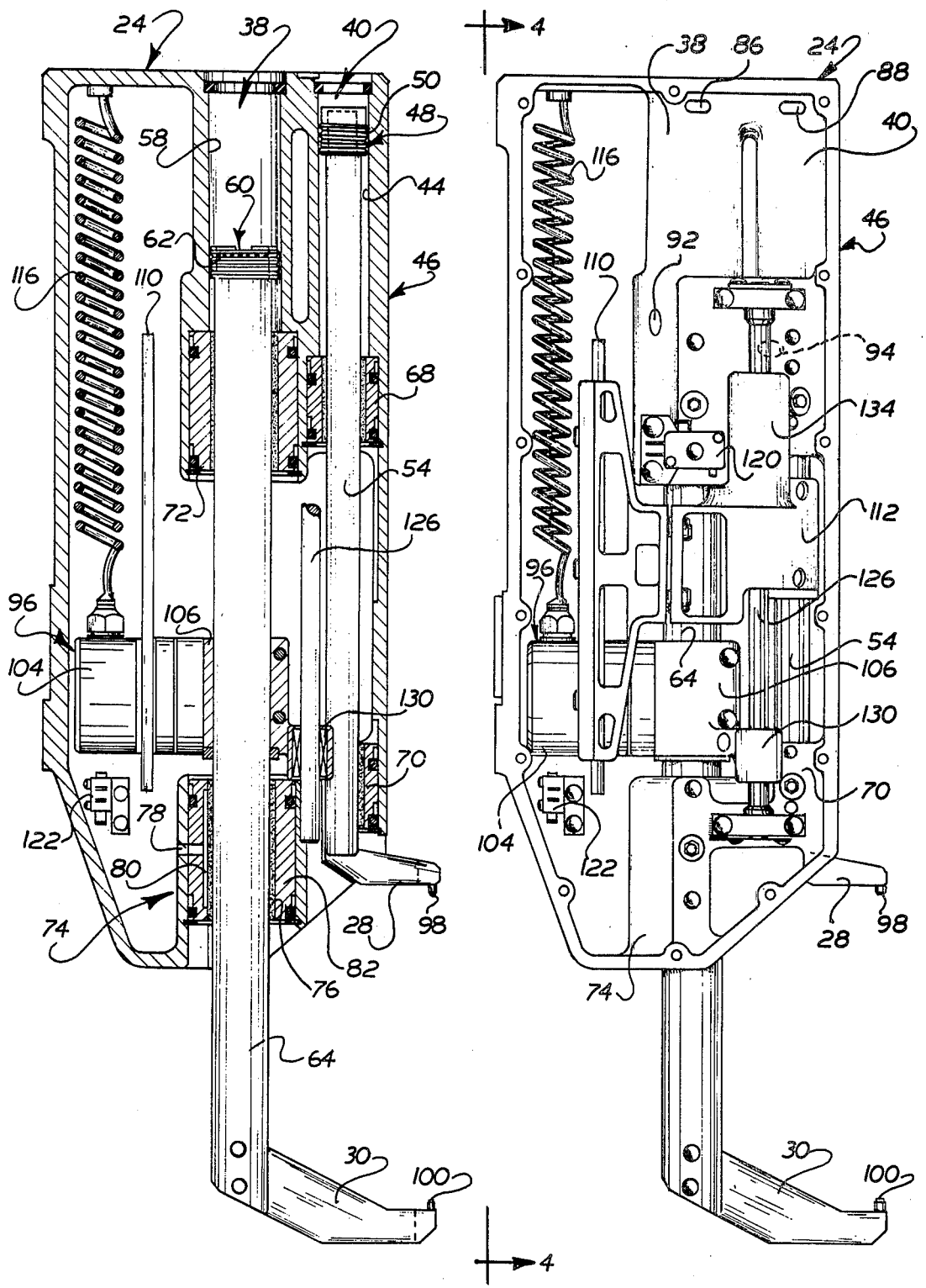
FIG. 2 is a partially broken away sectional view illustrating the manner in which gauge members utilized in the gauge assembly of FIG. 1 are supported and connected with pressure responsive fluid motors, the gauge assembly being illustrated in an intermediate condition between a fully open condition and a fully closed condition.
FIG. 3 is a elevational view, similar to FIG. 2, with a cover plate for the gauge assembly removed to reveal the relationship between a scale, reader head, and the gauge members.
Figure 4:
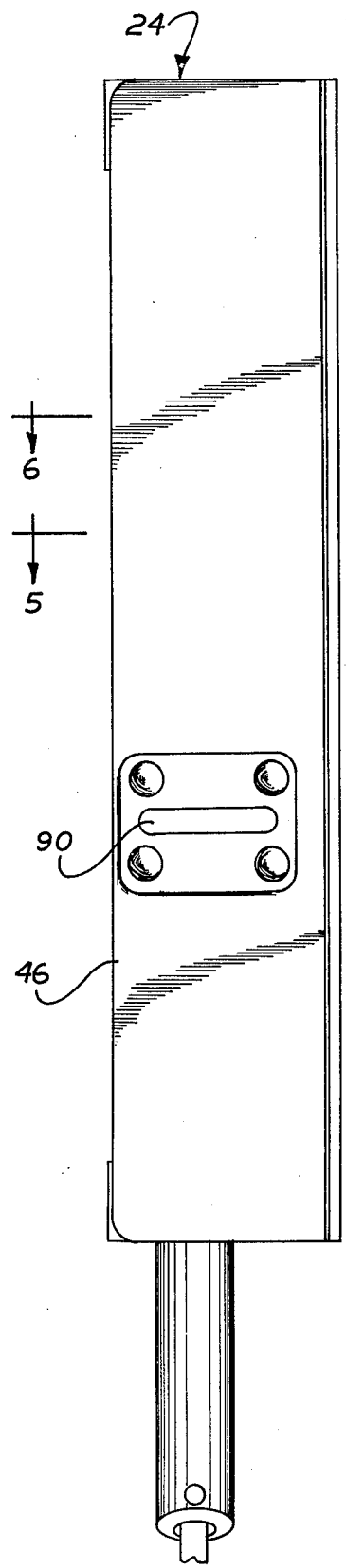
FIG. 4 is a view taken along the lines 4-4 of FIG. 3, further illustrating the construction of the gauge assembly.
Figure 6:
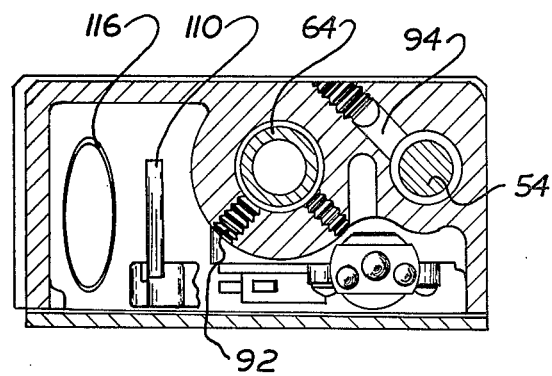
FIG. 6 is a sectional view, taken generally along the line 6—6 of FIG. 4, further illustrating the construction of the gauge assembly.

During operation of the fluid motors 38 and 40 to move the gauge members or calipers 28 and 30 between their open and closed positions, air is exhausted into the interior of the housing 46. Thus, the motors 38 and 40 are provided with air outlet vents 86 and 88 (see FIG. 3) at the head end portions of the motor cylinders 44 and 58. The air from the motor cylinders 44 and 58 is exhausted from the housing 46 through a porous vent 90 (see FIG. 4) formed in the wall of the housing 46. The rod ends of the motor cylinders 44 and 48 are supplied with air through control ports 92 and 94 (FIGS. 3 and 6).

Figure 5:
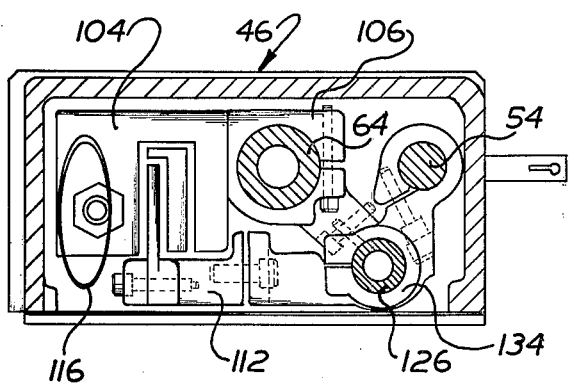
FIG. 5 is a sectional view, taken along the line 5—5 of FIG. 4, further illustrating the relationship between the reader head and scale.

A readout assembly 96 (FIGS. 2 and 3) is connected with the two gauge members 28 and 30 to provide an indication of the distance between workpiece engaging surfaces of anvils 98 and 100 on the gauge members. The readout assembly 96 includes a reader head 104 (FIGS. 3 and 5) which is fixedly mounted on the piston rod 64 by a clamp assembly 106. Therefore the reader head 104 moves up and down with the gauge member 30 as it moves between the open and closed positions of FIGS. 7 and 8. Similarly, a scale member 110 is fixedly connected with the piston rod 54 by a bracket assembly 112 (see FIGS. 3 and 5). Therefore the scale 110 moves up and down with the gauge member 28 as the gauge member moves between its open and closed positions.

The reader head 104 cooperates with scale 110 to provide output signals. These output signals are conducted to a suitable numerical control apparatus through a lead 116. The scale 110 may have any one of many different types of known codings on it. These codings can be of either the incremental type or the absolute type depending upon the numerical control system with which the gauge assembly 24 is used.

In addition to the readout from the reader head 104, the numerical control system for the grinding machine 10 is provided with a signal indicating when the gauge assembly 24 is in the fully open position of FIG. 7. Thus, a limit switch 120 (FIG. 3) is actuated by the clamp assembly 112 when the gauge member 28 is in the fully open position of FIG. 7. At the same time, a limit switch 122 (FIG. 3) is actuated by the reader head 104. The signals from the limit switches 120 and 122 provide a clear indication that the gauge assembly 24 has been operated to its fully open condition and can be safely moved between the operating position illustrated in solid lines in FIG. 1 and the retracted position illustrated in dashed lines in FIG. 1.

A stationary cylindrical guide rod 126 (see FIGS. 2, 3, and 5) is provided to hold the gauge members 28 and 30, scale 110 and reader head 104 against rotational movement relative to each other. To hold the reader head 104 and lower gauge member 30 against rotational movement about the central axis of the piston rod 64, a bearing assembly 130 (FIGS. 2 and 3) is connected with the clamp assembly 106. Upon movement of the gauge member 30, the bearing assembly 130 moves along the guide rod 126. Similarly, the gauge member 28 and scale 110 are held against rotational movement relative to the housing 46 by engagement of a bearing assembly 134 (see FIGS. 3 and 5) with the guide rod 126. The bearing assembly 134 is connected with the clamp assembly 112.

Pneumatic control circuitry 140 associated with the gauge assembly 24 is illustrated in FIG. 7. The pneumatic control circuitry 140 includes a main supply line 142 connected with a relatively high pressure source of air. The air is cleaned by a pair of filters 144 and 146 and is reduced to a desired supply pressure by a pressure regulator valve 148. The air from the pressure regulator valve 148 is supplied to a manifold line 150. The manifold line 150 is connected in fluid communication with the air bearings 68, 70, 72, and 74 by a conduit 152. Therefore, the air bearings are continuously supplied with air at the pressure in the manifold line 150 during operation of the gauge assembly 24.

A pair of solenoid operated control valves 156 and 158 are provided to control the operation of the pressure responsive motor 38 connected with the lower gauge member 30. Similarly, a pair of solenoid operated control valves 162 and 164 are provided to control the operation of the pressure responsive motor 40 connected with the upper gauge member 28.

When the gauge assembly 24 is in the open condition, the solenoid valves 156, 158, 162 and 164 are in the unactuated condition shown in FIG. 7. At this time the solenoid valve 156 is in a de-energized condition and air at a relatively low pressure is supplied from a pressure regulator valve 168 to a conduit 170. In one specific instance, this air had a pressure of approximately 9.1 pounds per square inch. Of course other air pressures could be utilized depending on the construction of the gauge assembly 24.

The relatively low pressure air in the line 170 is directed from the valve 156 through a conduit 172 to the unactuated control valve 158. This relatively low pressure air is then connected to the rod end of the motor cylinder 58 through a conduit 174. Since the air pressure being directed to the rod end of the motor cylinder 58 is relatively low in pressure, the weight of the piston 60 and piston rod 64 is sufficient to cause the gauge member 30 to move downwardly to the open condition of FIG. 7 under the influence of gravity.

The upper gauge member 28 is moved to the open position against the influence of gravity by air pressure in the motor 40. Thus, when the upper gauge member 28 is in the open position of FIG. 7, relatively high pressure air is conducted from a pressure regulator valve 178 to a conduit 180. In one specific instance an air pressure of 13.8 pounds per square inch was present in the conduit 180. The valve 162 directs this air pressure to a conduit 184 connected with the control valve 164. The control valve 164 directs the relatively high pressure air through a conduit 186 to the rod end of the motor cylinder 44 to hold the piston 48 upwardly against the influence of gravity.

When a gauging operation is to be initiated, the control valves 156 and 162 are operated from the unactuated condition of FIG. 7 to the actuated condition of FIG. 8 by closing switches 188 and 190. This causes the valve 156 (FIG. 8) to port air from a pressure regulator valve 194 to the conduit 172. The air pressure from the pressure regulator valve 194 is somewhat greater than the air pressure supplied by the pressure regulator valve 168. In one specific instance, the air pressure from the pressure regulator valve 194 was approximately 11.4 pounds per square inch.

The air pressure from the regulator valve 194 is ported through the actuator control valve 156 to the conduit 172. The air flows through the unactuated control valve 158 to the conduit 174 leading to the rod end of the motor cylinder 58. The relatively high air pressure causes the piston 60 to be moved upwardly against the influence of gravity. This brings the lower gauge member 30 into engagement with the lower portion of the workpiece 36.

Simultaneously with movement of the lower gauge member 30 into engagement with the workpiece 36, the upper gauge member 28 is lowered into engagement with the workpiece. Thus, closing of the switch 190 effects actuation of the control valve 162 to port air pressure from a pressure regulator valve 198 to the conduit 184. The air pressure supplied from the pressure regulator valve 198 is slightly less than the air pressure supplied by the pressure regulator valve 178. In one specific instance, the air pressure from the pressure regulator valve 198 was 12.0 pounds per square inch.

The somewhat lower air pressure from the pressure regulator valve 198 is ported through the unactuated control valve 164 to the conduit 186 leading to the rod end of the motor cylinder 44. The reduction in air pressure in the motor 40 enables the piston 48 to move downwardly under the influence of gravity. This brings the upper gauge member 28 into engagement with the workpiece 36 in the manner shown in FIG. 8.

When the actual measurement of the workpiece 36 is to be taken, the gauge members 28 and 30 are pressed against the workpiece with a predetermined and repeatable gauging force to provide for accurate repeated gauging operations. The force with which the gauge members 28 and 30 are pressed against the workpiece is somewhat greater than the force which they engage the workpiece when they are initially moved to the closed position of FIG. 8.

When a measurement is to be taken, a switch 202 is closed to actuate the control valve 158. The control valve 158 is then effective to port fluid under pressure from a pressure regulator valve 204 to the rod end of the motor cylinder 58. The pressure supplied from the pressure regulator valve 204 is greater than the pressure supplied from either the pressure regulator valve 168 or the pressure regulator valve 194. In one specific instance, the pressure regulator valve 204 supplied the control valve 158 with air at a pressure of 12.2 pounds per square inch.

The actuated control valve 158 is effective to direct this relatively high air pressure to the conduit 174. The conduit 174 conducts the air pressure to the rod end of the motor cylinder 58. This increased fluid pressure causes the piston 60 to press the lower gauge member 30 against the lower portion of the workpiece with a predetermined gauging force.

In addition, when a measurement is to be taken the control valve 164 is also actuated by closing a switch 208 simultaneously with closing of the switch 202 (FIG. 8). This causes the control valve 164 to direct air from a pressure regulator valve 210 to the conduit 186 leading to the rod end of the motor cylinder chamber 44. The pressure regulator valve 210 is effective to supply air at a pressure which is lower than the air pressure supplied by the pressure regulator valves 178 and 198.

In one specific instance, the pressure regulator valve 210 was effective to supply air at a pressure of 10.7 pounds.

This relatively low air pressure enables the upper gauge member 28 to press downwardly under the influence of gravity against the upper portion of the workpiece 36. Since the weight of the piston 48, piston rod 54 and gauge member 28 remains constant along with the air pressure supplied from the pressure regulator 210, a predetermined repeatable measuring force is applied against the workpiece.

It should be noted that the force with which the upper and lower gauge members 28 and 30 press against the workpiece 36 when a measurement is taken is determined by the air pressure directed to the rod ends of the motor cylinder chambers 44 and 58. During repeated gauging operations on workpieces of different sizes, the same air pressure is ported to the rod ends of the motor cylinder chambers 44 and 58 when the measurement is taken. Therefore the gauge members 28 and 30 are always pressed against the workpiece with the same force at the time when the measurement is taken. This is true regardless of the diameter of the workpiece 36 and is not dependent upon spring force which can vary with the extent to which the springs are compressed.

Although specific air pressures have been set forth above to facilitate understanding the mode of operation of the control circuitry 140 and gauge assembly 24, it should be understood that these pressures are for purposes of illustration only and that other pressures could be utilized if desired. It should also be noted that the motor 38 for moving the lower gauge member 30 is larger than the motor 40 for moving the upper gauge member 28. This is because the lower gauge member 30 projects further out of the housing 46 for the gauge assembly and is subjected to higher operating forces.

In view of the foregoing description it is apparent that the present invention provides a new and improved gauge assembly 24 having upper and lower gauge members or calipers 28 and 30 which are movable relative to each other. A pressure responsive fluid motor 40 is provided to move the upper gauge member 28 between a raised position (FIG. 7) in which it is spaced apart from the workpiece and a lowered position (FIG. 8) in which the upper gauge member engages the workpiece. The lower gauge member 30 is movable by a second pressure responsive fluid motor 38 to a lowered position (FIG. 7) in which it is spaced apart from the workpiece 36 and a raised position (FIG. 8) in which it engages the workpiece.

During a gauging operation, a relatively low fluid pressure is directed to the pressure responsive motor 40 connected with the upper gauge member or caliper 28 so that it presses downwardly under the influence of gravity, against the workpiece 36 with a predetermined gauging force. A predetermined fluid pressure is ported to the motor 38 associated with the lower gauge member or caliper 30 to hold it upwardly against the workpiece 36 with a predetermined gauging force. Since the fluid pressures ported to the motors 38 and 40 are accurately repeatable, the gauging forces applied againt the workpiece 36 by the gauge members 28 and 30 during successive gauging operations remains constant. To facilitate movement of the gauge members they are supported by fluid bearings (68, 70, 72 and 74).

What is claimed is:

1. A gauge assembly for use in measuring a workpiece, said gauge assembly comprising upper and lower gauge members which are movable relative to each other, said upper gauge member being movable between a raised position spaced apart from the workpiece and a lowered position engaging an upper portion of the workpiece, said lower gauge member being movable between a lowered position spaced apart from the workpiece and a raised position engaging a lower portion of the workpiece, first fluid pressure responsive means connected with said upper gauge member for moving said upper gauge member between its raised and lowered positions, second fluid pressure responsive means connected with said lower gauge member for moving said lower gauge member between its raised and lowered positions, first control means for directing to said first pressure responsive means a first fluid pressure to effect movement of said upper gauge member from its lowered position to its raised position, for directing to said first pressure responsive means a second fluid pressure which is less than said first fluid pressure to effect movement of said upper gauge member from its raised position to its lowered position, and for directing to said first pressure responsive means a third fluid pressure which is less than said second fluid pressure to effect engagement of the workpiece by said upper gauge member with a predetermined gauging force, and second control means for directing to said second pressure responsive means a fourth fluid pressure to effect movement of said lower gauge member from its raised position to its lowered position, for directing to said second pressure responsive means a fifth fluid pressure which is greater than said fourth fluid pressure to effect movement of said lower gauge member from its lowered position to its raised position, and for directing to said second pressure responsive means a sixth fluid pressure which is greater than said fifth fluid pressure to effect engagement of the workpiece by said lower gauge member with a predetermined gauging force.

2. A gauge assembly as set forth in claim 1 wherein said first and second control means are effective to simultaneously direct the third fluid pressure to said first pressure responsive means and the sixth fluid pressure to said second pressure responsive means to effect engagement of the workpiece by said first and second gauge members with the predetermined gauging forces.

3. An assembly as set forth in claim 1 wherein said first fluid pressure responsive means includes means for defining a first variable volume chamber, said second fluid pressure responsive means includes means for defining a second variable volume chamber.

4. An assembly as set forth in claim 3 wherein said first fluid pressure responsive means is effective to reduce the volume of said first variable volume chamber upon operation of said first control means to change the fluid pressure directed to said first fluid pressure responsive means from said first pressure to said second pressure, said first fluid pressure responsive means being effective to increase the volume of said first variable volume chamber upon operation of said first control means to change the fluid pressure directed to said first fluid pressure responsive means to the first fluid pressure.

5. An assembly as set forth in claim 4 wherein said second fluid pressure responsive means is effective to increase the volume of said second variable volume chamber upon operation of said second control means to change the fluid pressure directed to said second fluid pressure responsive means from said fourth pressure to said fifth pressure, said second fluid pressure responsive means being effective to decrease the volume of said second variable volume chamber upon operation of said second control means to change the fluid pressure directed to said second fluid pressure responsive means to the fourth fluid pressure.

6. An assembly as set forth in claim 5 wherein said first fluid pressure responsive means is ineffective to change the volume of said first variable volume chamber upon operation of said first control means to change the fluid pressure directed to said first fluid pressure responsive means from the second pressure to the third pressure with said upper gauge member in its lowered position, said second fluid pressure means being ineffective to change the volume of said second variable volume chamber upon operation of said second control means to change the fluid pressure directed to said second fluid pressure responsive means from the fifth pressure to the sixth pressure with said lower gauge member in its raised position.

7. An assembly as set forth in claim 1 further including first bearing means for supporting said upper gauge member for movement between its raised and lowered positions, said first bearing means including a porous metal sleeve circumscribing a portion of said upper gauge member and means for inducing a flow of fluid through said porous metal sleeve toward the circumscribed portion of said upper gauge member to facilitate movement of said upper gauge member relative to said porous metal sleeve.

8. An assembly as set forth in claim 7 further including second bearing means for supporting said lower gauge member for movement between its raised and lowered positions, said second bearing means including a second porous metal sleeve circumscribing a portion of said lower gauge member and means for inducing a flow of fluid through said second porous metal sleeve toward the circumscribed portion of said lower gauge member to facilitate movement of said lower gauge member relative to said second porous metal sleeve.

9. An assembly as set forth in claim 1 further including scale means connected with one of said gauge members for movement therewith and reader means connected with the other of said gauge member for movement therewith, said reader means cooperating with said scale means to provide an output indicative of the distance between the engaged upper and lower portions of the workpiece when said upper gauge member is in its lowered position and said lower gauge member is in its raised position.

10. A gauge assembly for use in measuring a workpiece, said gauge assembly comprising upper and lower gauge members which are movable relative to each other, said upper gauge member being movable between a raised position spaced apart from the workpiece and a lowered position engaging an upper portion of the workpiece, said lower gauge member being movable between a lowered position spaced apart from the workpiece and a raised position engaging a lower portion of the workpiece, first fluid pressure responsive means connected with said upper gauge member for moving said upper gauge member between its raised and lowered positions, said first fluid pressure responsive means including a first cylinder, a first piston slidably disposed within said first cylinder, and a first piston rod having an upper portion connected with said first piston and a lower portion connected with said upper gauge member, second fluid pressure responsive means connected with said lower gauge member for moving said lower gauge member between its raised and lowered positions, said second fluid pressure responsive means including a second cylinder, a second piston slidably disposed within said second cylinder and a second piston rod having an upper portion connected with said second piston and a lower portion connected with said lower gauge member, first control means for effecting operation of said first pressure responsive means to effect movement of said upper gauge member from its lowered position to its raised position and for effecting operation of said first pressure responsive means to move said upper gauge member from its raised position to its lowered position, second control means for effecting operation of said second pressure responsive means to move said lower gauge member from its raised position to its lowered position and for effecting operation of said second pressure responsive means to move said lower gauge member from its lowered position to its raised position, first and second bearing means for supporting said upper gauge member for movement between its raised and lowered positions, said first bearing means including a first porous metal sleeve circumscribing the upper portion of said first piston rod and means for inducing a flow of fluid through said first porous metal sleeve toward the circumscribed upper portion of said first piston rod to facilitate movement of said first piston rod relative to said first porous metal sleeve, said second bearing means including a second porous metal sleeve disposed in a coaxial relationship with said first porous metal sleeve and circumscribing the lower portion of said first piston rod and means for inducing a flow of fluid through said second porous metal sleeve toward the circumscribed lower portion of said first piston rod to facilitate movement of said first piston rod relative to said second porous metal sleeve, and third and fourth bearing means for supporting said lower gauge member for movement between its raised and lowered positions, said third bearing means including a third porous metal sleeve circumscribing the upper portion of said second piston rod and means for inducing a flow of fluid through said third porous metal sleeve toward the circumscribed upper portion of said second piston rod to facilitate movement of said second piston rod relative to said third porous metal sleeve, said fourth bearing means including a fourth porous metal sleeve disposed in a coaxial relationship with said third porous metal sleeve and circumscribing the lower portion of said second piston rod and means for inducing a flow of fluid through said fourth porous metal sleeve toward the circumscribed lower portion of said second piston rod to facilitate movement of said second piston rod relative to said fourth porous metal sleeve.

* * * * *